UNITED STATES PATENT OFFICE.

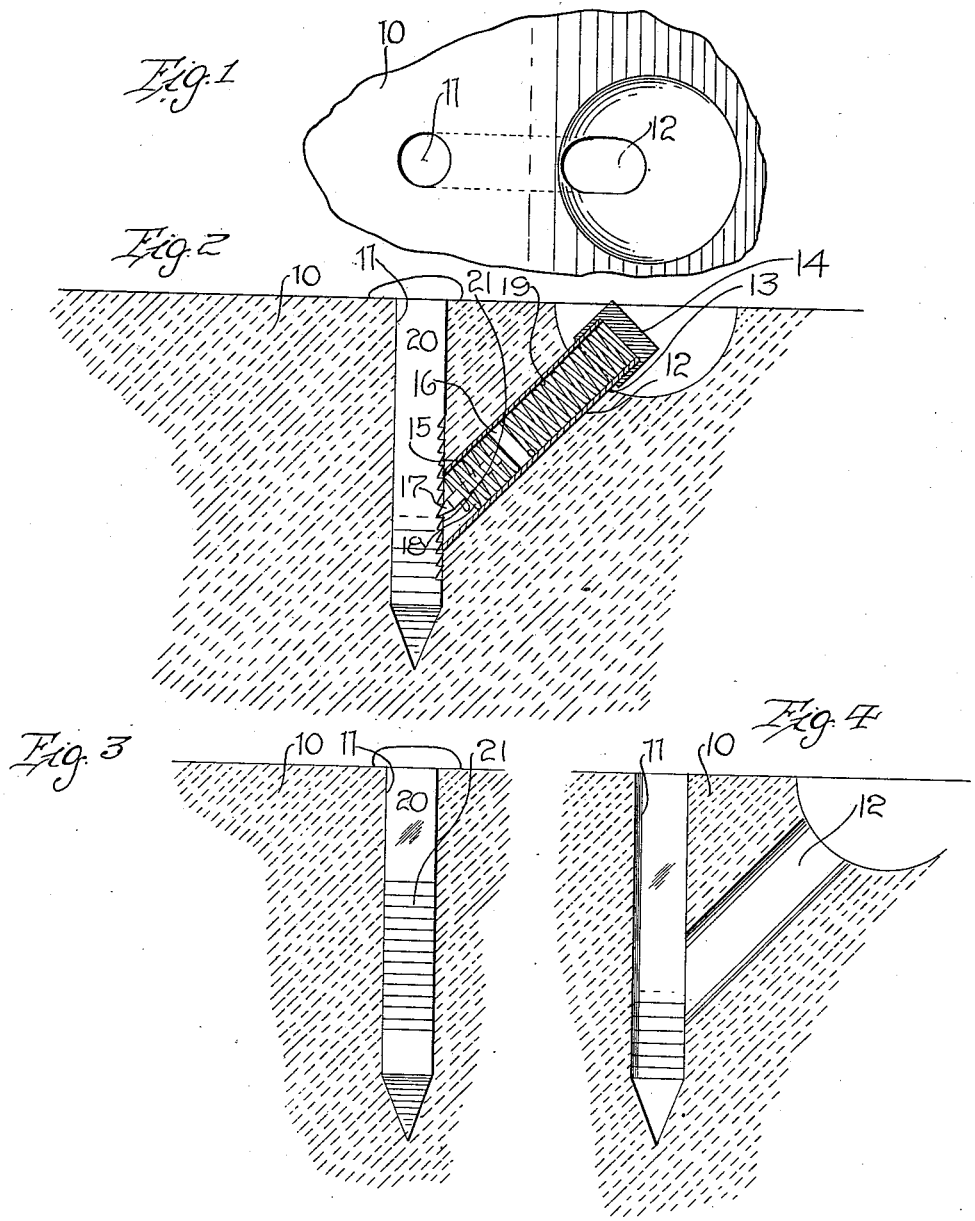

CHRISTIAN C. DINGER AND GEORGE B. GOUCHER, OF EMINENCE, MISSOURI.

SPIKE-LOCK.

1,095,626.  Specification of Letters Patent.  Patented May 5, 1914.

Application filed April 23, 1913. Serial No. 763,153.

*To all whom it may concern:*

Be it known that we, CHRISTIAN C. DINGER and GEORGE B. GOUCHER, citizens of the United States, residing at Eminence, in the county of Shannon and State of Missouri, have invented certain new and useful Improvements in Spike-Locks, of which the following is a specification, reference being had to the accompanying drawings.
This invention relates to spikes and has for an object to provide means for positively securing spikes from working loose in cement ties.

A further object is to provide means whereby the spike may be secured in position by simply tapping the spike with a hammer, there being a novel spring pressed dog that engages a rack on the spike during the operation of driving the spike home, which dog positively prevents accidental retrograde movement of the spike.

A still further object of the invention is to provide an extremely simple and durable device of this character which will be inexpensive to manufacture and will be formed of a few parts that will not easily get out of order.

With the above objects in view the invention consists of certain novel details of construction and combination of parts hereinafter fully described and claimed, it being understood that various modifications may be made in the minor details of construction within the scope of the appended claims.
In the accompanying drawing illustrating this invention:—Figure 1 is a fragmentary plan view showing the tie before application of the device. Fig. 2 is a sectional view showing the application of the device, with the spike in elevation. Fig. 3 is a view showing the rack face of the spike. Fig. 4 is a sectional view showing the location of the openings for the reception of the device in the tie.
Referring now to the drawing in which like characters of reference designate similar parts, 10 designates a tie of hardened plastic material such as cement or the like, the tie being provided with a spike opening 11 and also with a cylindrical opening 12 which is arranged obliquely to and communicates with the spike opening and opens through the face of the tie.

Arranged in the oblique opening 12 is a pipe 13 which extends throughout the length of the opening and projects at the outer end beyond the face of the tie, being there closed by a removable screw cap 14. Arranged in the bore of the pipe is a dog 15 having at one end a disk head 16 which is slidably fitted in the pipe and having the opposite end beveled as shown at 17. Seated on the dog is a helical spring 18 which bears at the outer end against the head 16 and at the inner end is fixed to the pipe, this spring exerting an outward pressure upon the dog. A helical spring 19 is arranged in the pipe between the dog head 16 and cap 14, this spring being of greater strength than the spring 18 and upon the cap being screwed tight, serving to move the dog forwardly against the tension of the spring 18 whereby the dog enters the spike opening 11.

A spike 20 having a rack 21 on one edge is inserted in the spike opening 11, the teeth of the rack pointing upwardly. The dog engages with the rack and prevents retrograde movement of the spike until the cap 14 is loosened to relieve the tension of the spring 19 and permit of the spring 18 urging the dog outwardly.

To apply the spike, the same is tapped with a hammer and thus driven home, the dog permitting of the spike moving downwardly but positively preventing any upward movement of the spike. Should it be necessary to remove the spike, the cap 14 is loosened whereupon the dog disengages from the spike as above described, and the latter may be easily and quickly withdrawn.

From the above description it will be seen that we have provided an extremely simple device of the character described which is formed of a few parts that will not easily get out of order and which is strong and durable, and is proof against accidental displacement.

What is claimed, is:—

1. The combination with a spike having a rack on one edge, of a guide tube arranged at an oblique angle to said spike, and a spring pressed dog in said tube engaging said rack and normally holding said spike against retrograde movement.

2. The combination with a spike having a rack on one edge, of a guide tube arranged at an oblique angle to said spike, a dog having a head fitting in the bore of said tube, a cap closing said tube, a spring on said dog bearing against said head and adapted to urge said dog outwardly, and a second spring in said tube between said head and said cap and normally holding said dog in operative position.

3. The combination with a hardened plastic tie having a spike opening formed therein, and having an opening arranged obliquely to said spike opening and communicating at the inner end therewith and opening through the face of the tie at the outer end, of a spike in said spike opening having a rack on one face, a tube in said oblique opening, a removable screw cap closing the outer end of said tube, a dog in said tube engaging said rack and holding said spike against retrograde movement, a spring seated on said dog and normally urging the dog outwardly, and a spring confined under tension between said dog and said cap and normally holding said dog in operative position.

In testimony whereof we hereunto affix our signatures in the presence of two witnesses.

CHRISTIAN C. DINGER.
GEORGE B. GOUCHER.

Witnesses:
L. O. CHILTON,
A. E. ORCHARD.

Copies of this patent may be obtained for five cents each, by addressing the "Commissioner of Patents, Washington, D. C."